United States Patent
Holt et al.

(10) Patent No.: US 11,050,761 B2
(45) Date of Patent: *Jun. 29, 2021

(54) SYSTEM FOR EFFICIENT MANAGEMENT OF GRANT TOKENS FOR IDENTIFYING A CLIENT SYSTEM

(71) Applicant: Barclays Execution Services Limited, London (GB)

(72) Inventors: Dickon Holt, Knutsford (GB); Michael Forrest, Knutsford (GB)

(73) Assignee: Barclays Execution Services Limited, London (GB)

( * ) Notice: Subject to any disclaimer, the term of this patent is extended or adjusted under 35 U.S.C. 154(b) by 140 days.

This patent is subject to a terminal disclaimer.

(21) Appl. No.: 16/382,139

(22) Filed: Apr. 11, 2019

(65) Prior Publication Data
US 2019/0319966 A1 Oct. 17, 2019

(30) Foreign Application Priority Data
Apr. 11, 2018 (EP) .................................... 18166880

(51) Int. Cl.
*H04L 29/06* (2006.01)
(52) U.S. Cl.
CPC ........ *H04L 63/108* (2013.01); *H04L 63/0853* (2013.01)
(58) Field of Classification Search
None
See application file for complete search history.

(56) References Cited

U.S. PATENT DOCUMENTS

| 8,543,702 B1* | 9/2013 | Marshall ............. G06F 12/0811 709/226 |
| 9,882,892 B1* | 1/2018 | Vogel .................... H04L 63/102 |
| 2003/0200202 A1 | 10/2003 | Hsiao et al. |
| 2015/0319174 A1 | 11/2015 | Hayton et al. |
| 2015/0350186 A1 | 12/2015 | Chan et al. |

(Continued)

FOREIGN PATENT DOCUMENTS

WO  WO 2013/186070  12/2013

OTHER PUBLICATIONS

International Search Report and Written Opinion dated Jun. 14, 2019 in connection with International Application No. PCT/EP2019/059270.

(Continued)

*Primary Examiner* — Kambiz Zand
*Assistant Examiner* — Arezoo Sherkat
(74) *Attorney, Agent, or Firm* — Wilmer Cutler Pickering Hale and Dorr LLP

(57) ABSTRACT

A client system comprises processing circuitry configured to receive, from an authorisation system, a first grant token for identifying the client system at the authorisation system, the first grant token having a corresponding time to expire indicative of a time at which the first grant token will not be valid for obtaining a protected resource from a resource system. The client system transmits, to the authorisation system, a refresh request for a second grant token for identifying the client system at the authorisation system, wherein the refresh request is transmitted based on the expiry time of the first grant token; and receives the second grant token at the client system, in response to the refresh request.

15 Claims, 9 Drawing Sheets

(56) References Cited

U.S. PATENT DOCUMENTS

| | | | |
|---|---|---|---|
| 2016/0080383 A1* | 3/2016 | Hockings | H04L 9/3213 |
| | | | 726/9 |
| 2017/0048233 A1 | 2/2017 | Khylkouskaya et al. | |
| 2018/0063140 A1 | 3/2018 | D | |
| 2018/0139192 A1* | 5/2018 | Pishinov | H04L 63/0815 |
| 2018/0191701 A1* | 7/2018 | Kong | H04L 63/083 |

OTHER PUBLICATIONS

International Search Report and Written Opinion dated May 17, 2019 in connection with International Application No. PCT/EP2019/059291.
International Search Report and Written Opinion dated Jun. 4, 2019 in connection with International Application No. PCT/EP2019/059338.
International Search Report and Written Opinion dated Jun. 4, 2019 in connection with International Application No. PCT/EP2019/059283.
Extended European Search Report dated Sep. 11, 2018 in connection with European Application No. 18166874.0.
Extended European Search Report dated Sep. 6, 2018 in connection with European Application No. 18166880.7.
Extended European Search Report dated Sep. 6, 2018 in connection with European Application No. 18166865.8.
Extended European Search Report dated Sep. 11, 2018 in connection with European Application No. 18166873.2.
Hardt et al., The OAuth 2.0 Authorization Framework; draft-ietf-oauth-v2-3 1.txt. The Oauth 2.0 Authorization Framework; Draft-IETF-OAuth-V2-31.TXT. Internet Engineering Task Force. IETF; Standardworkingdraft. Internet Society (ISOC). Aug, 1, 2012; 1-72.

* cited by examiner

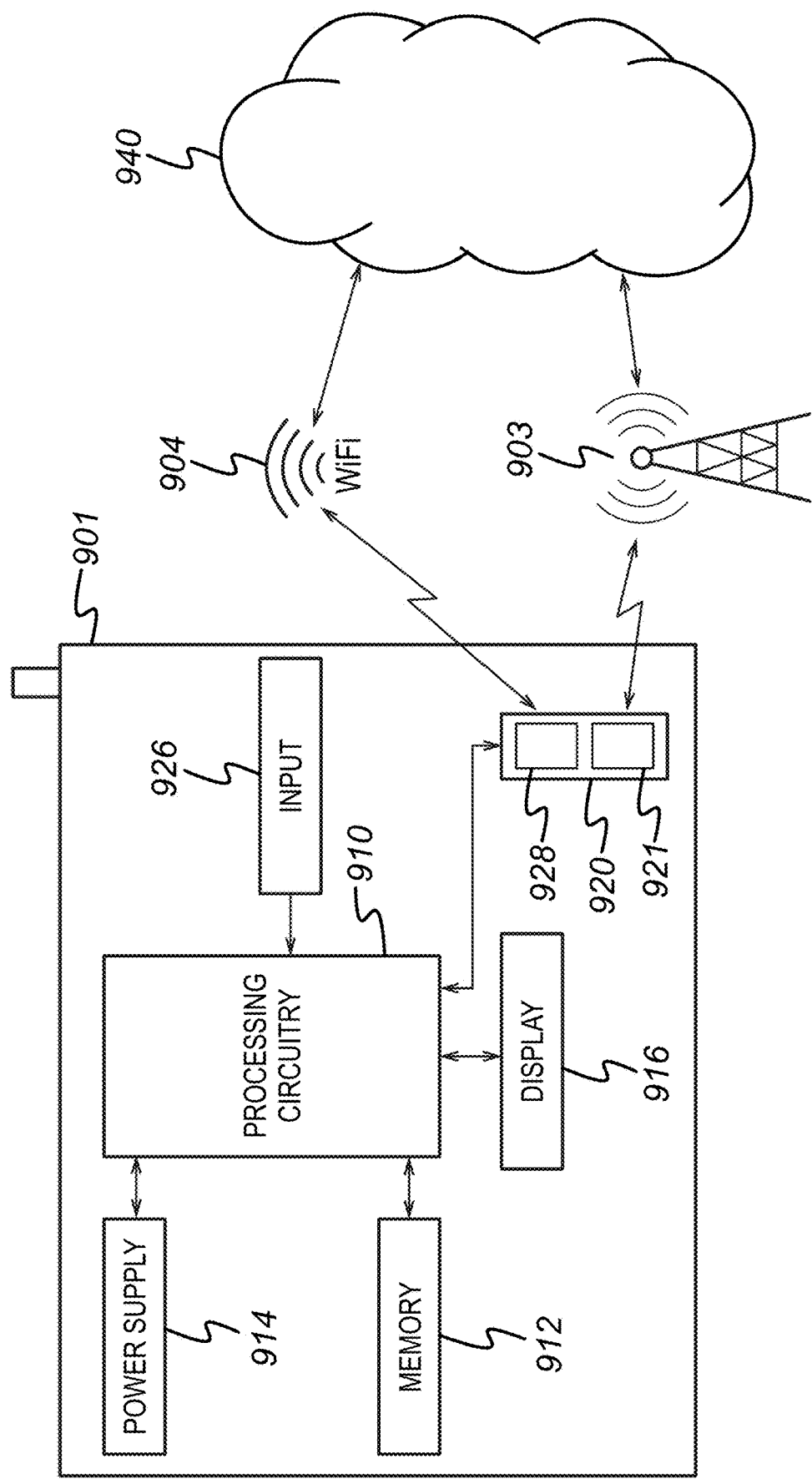

SYSTEM FOR EFFICIENT MANAGEMENT OF GRANT TOKENS FOR IDENTIFYING A CLIENT SYSTEM

RELATED APPLICATIONS

Foreign priority benefits are claimed under 35 U.S.C. § 119 to European application number 18166880.7, filed Apr. 11, 2018, the entire contents of which is hereby incorporated herein by reference in its entirety.

TECHNICAL FIELD

This disclosure relates to a system, a method and a computer program for efficiently managing grant tokens for identifying a client system at an external system.

BACKGROUND

The OAuth ("Open Authorization") 2.0 authorisation framework enables a third-party application to obtain limited access to an HTTP service, such as access to a protected resource. The third-party application may obtain access to the HTTP service on behalf of a resource owner by orchestrating an approval interaction between the resource owner and the HTTP service. Alternatively, the third-party application can obtain access to the HTTP service on its own behalf.

FIG. 1 illustrates an overview of the OAuth 2.0 protocol flow, involving the following four entities: a resource owner 1, a client 3, an authorisation server 5 and a resource server 7. The resource owner 1 is an entity that is capable of granting access to a protected resource. The resource owner 1 may be a person, referred to as a user operating a user device. The client 3 is an entity, or an application, that can make a request for access to the protected resource on behalf of the resource owner 1, when authorised by the resource owner 1. The authorisation server 5 is an entity that grants and issues access tokens to the client after successfully authenticating the resource owner and obtaining authorisation. The resource server 7 is an entity that hosts the protected resource and is capable of accepting and responding to requests for the protected resource using access tokens.

Access tokens, such as those issued by the authorisation server 5, are credentials used to access protected resources. An access token is a string representing an authorisation issued to the client. The string is usually opaque to the client. Tokens represent specific scopes and durations of access, granted by the resource owner, and enforced by the resource server and authorisation server.

An access token may denote an identifier used to retrieve the authorisation information or may self-contain the authorisation information in a verifiable manner (i.e., a token string consisting of some data and a signature). Access tokens can have different formats, structures, and methods of utilization (e.g., cryptographic properties) based on the resource server security requirements.

An access token can be used to identify a client. When an access token is used in this context it may be referred to herein as a grant token, rather than an access token. However, a grant token could equally be described as an access token.

The authorisation server 5 can issue refresh tokens, which are credentials used to obtain access tokens. Refresh tokens are issued to the client by the authorisation server and are used to obtain a new access token when the current access token becomes invalid or expires, or to obtain additional access tokens with identical or narrower lifetime and fewer permissions than authorised by the resource owner). Issuing a refresh token is optional at the discretion of the authorisation server. If the authorisation server issues a refresh token, it is included when issuing an access token.

A refresh token is a string representing the authorisation granted to the client by the resource owner. The string is usually opaque to the client. The token denotes an identifier used to retrieve the authorisation information.

In step 11, client 3 requests authorisation from the resource owner 1 for access to the protected resource. The authorisation request can be made directly to the resource owner 1, or indirectly via the authorisation server 5 as an intermediary.

In step 12, the client 3 receives an authorisation grant, which is a credential representing the authorisation provided by the resource owner 1. This authorisation may be expressed using one of a plurality of "grant types" described in the Authorisation Framework. The authorisation grant type depends on the method(s) used by the client 3 to request authorisation and the type(s) supported by the authorisation server 5.

In step 13, the client 3 requests an access token by authenticating with the authorisation server 5 and presenting the authorisation grant. The authentication may be expressed using one of a plurality of "authentication types" for authenticating identifying client 3 at the authorisation server 5. The authentication type depends on the method(s) used by the client 3 to authenticate itself and the type(s) supported by the authorisation server 5.

In step 14, the authorisation server 5 authenticates the client 3 and validates the authorisation grant, and if valid, issues an access token.

In step 15, the client 3 requests the protected resource from the resource server 7 and authenticates itself at the resource sever 7 by presenting the access token.

In step 16, the resource server 7 validates the access token. If the access token is valid, the resource server 7 serves the request by transmitting the protected resource to the client 3.

In a specific implementation of the protocol explained above, the client 3 may perform steps 13 and 14 in order to obtain a grant token that identifies the client 3 at the resource server 7. Then by performing steps 15 and 16, the client 3 can use the grant token to receive a protected resource from the resource server 7, such as identification code. This identification code can be used to subsequently service a request for the client 3 to access a protected resource of the resource owner 1, where the identification code is used to identify the request.

There may be an expiry time associated with each grant token, where a grant token will be deemed to be invalid by the resource server 7 after the expiry time. If the grant token is valid, it can be used in the process of accessing the identification code. However, if the grant token is invalid, it cannot be used to access the identification code successfully.

Since the grant tokens can expire, the client 3 may receive a request from the resource owner 1 to access the protected resource when the client has an expired grant token. In this scenario, the client 3 may transmit the expired grant token to the resource server 7 in an attempt to service the request from the resource owner. However, the expired grant token will be rejected by the resource server 7, and the client 3 must obtain an unexpired grant token in order to service the resource owner's request. This process delays the protected resource from being provided to the client 3 and introduces unnecessary use of processing resources and bandwidth usage.

Therefore, there is a need for a system that is able to quickly respond to requests from resource owners for a client to access a protected resource, while making efficient use of bandwidth and processing resources.

SUMMARY

In one aspect of the invention there is provided a computer-implemented method comprising: receiving, at a client system from an authorisation system, a first grant token for identifying the client system at the authorisation system, the first grant token having a corresponding time to expire indicative of a time at which the first grant token will not be valid for obtaining a protected resource from a resource system; transmitting, from the client system to the authorisation system, a refresh request for a second grant token for identifying the client system at the authorisation system, wherein the refresh request is transmitted based on the expiry time of the first grant token; and receiving the second grant token at the client system, in response to the refresh request.

In this way, by refreshing the grant token based on its expiry time, the client system is able to pre-emptively obtain a valid grant token before a request from a user is received for accessing a protected resource. This avoids unnecessarily attempting to use an invalid grant token, which if used would waste bandwidth and processing resources. In addition, since use of invalid grant tokens can be avoided, the system is able to respond to user requests more quickly than in conventional systems.

BRIEF DESCRIPTION OF THE DRAWINGS

Embodiments of the invention will be described, by way of example, with reference to the following drawings, in which:

FIG. 9 illustrates a schematic diagram of an example device in the system.

DETAILED DESCRIPTION

Figure 1:
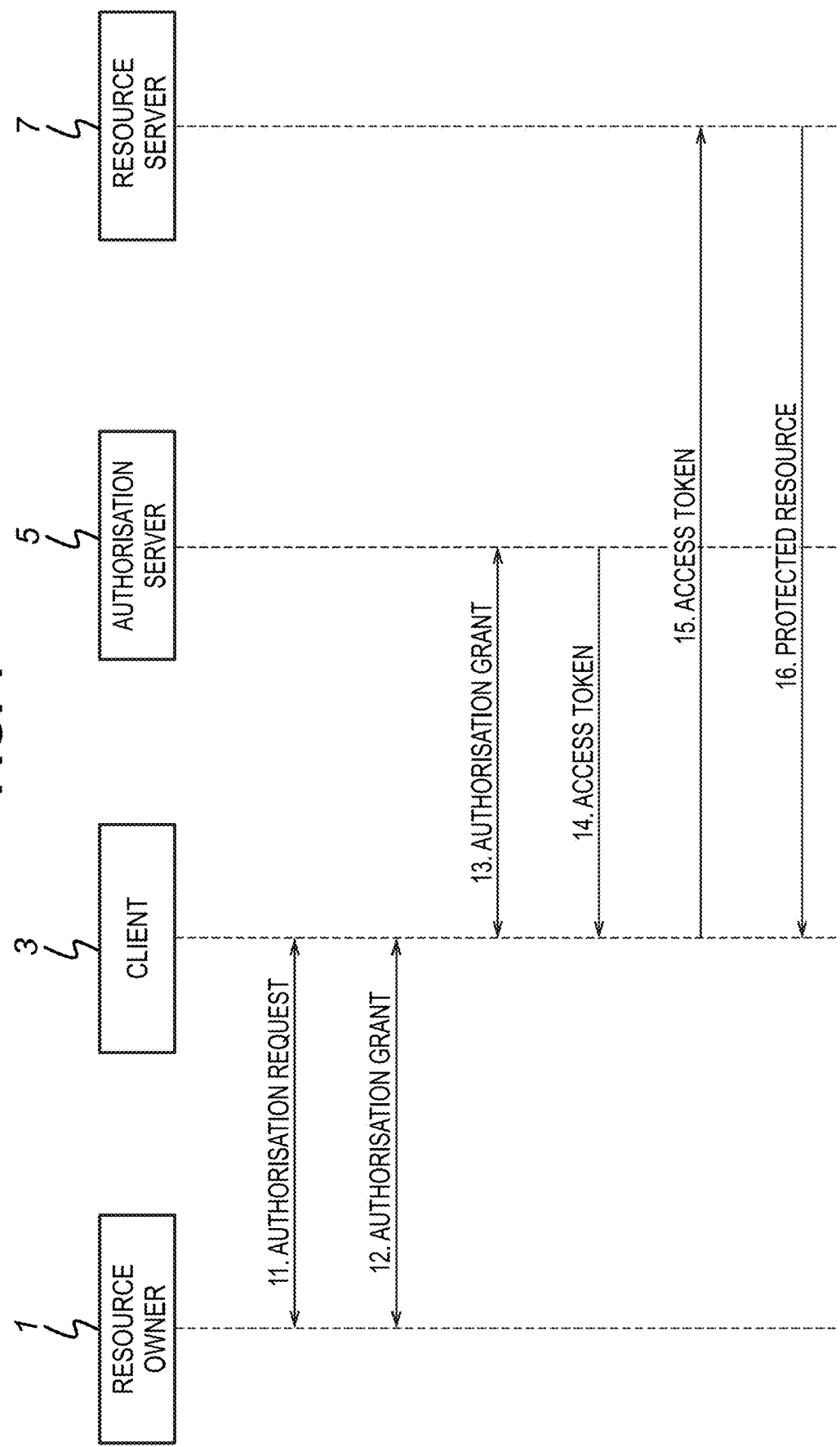
FIG. 1 illustrates a protocol sequence diagram of the OAuth 2.0 framework.
Figure 2:
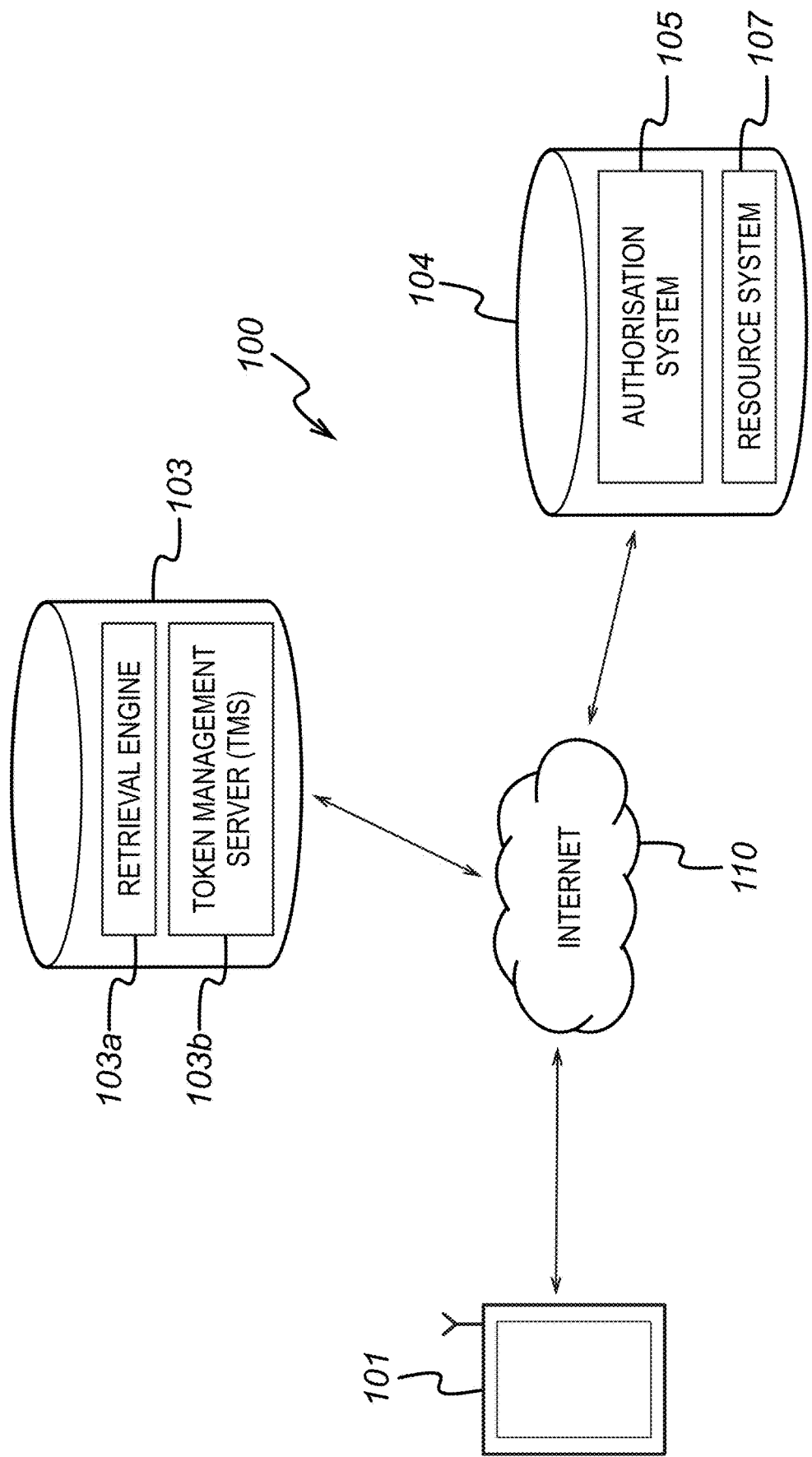
FIG. 2 illustrates the general architecture of a system for accessing a protected resource.

Referring to FIG. 2, there is a system 100 for managing access to protected resources. The system 100 comprises one or more user devices 101, a client system 103 and an external system 104, which comprises an authorisation system 105 and a resource system 107.

The user device 101 may be considered as the resource owner 1, the client system 103 may be considered as the client 3, the authorisation system 105 may be considered as the authorisation server 5, and the resource system 107 may be considered as the resource sever 7 when considering the methods and systems described herein in terms of the OAuth 2.0 protocol.

The external system 104 is configured to store data associated with users of devices, such as the user device 101. The data stored at the external system 104 may comprise protected resources, such as one or more secure data items.

Each one of the protected resources may be indicative of private information relating to a user of the external system 104. In one specific example, each data item stored at the external system 104 comprises financial data relating to the user, such as details that enable the user to make payments or the details of previous financial transactions made by the user.

The following systems and methods are described in the context of managing access to financial data in terms of the OAuth 2.0 protocol. However, these systems and methods could be used to manage access to any type of protected resource for which access by unauthorised third parties is to be restricted using another suitable protocol, such as SAML, OpenID and the like.

The client system 103 is configured to access protected resources stored at the external system 104, upon request from a user.

The external system 104 may comprise a plurality of sub-systems, for instance, a plurality of servers. In the example described herein, the external system 104 comprises the authorisation system 105 and the resource system 107. The authorisation server 105 is configured to authorise requests for access to protected resources that are stored at the resource system 107. Alternatively, the external system 104 may comprise a single server for performing these functions.

The client system 103 may comprise a plurality of sub-systems, for instance, a plurality of servers. In the example described herein, the client system 103 comprises a retrieval engine 103a and a token management server (TMS) 103b. The retrieval engine 103a is configured to interface with the user device 101, and the TMS 103b is configured to interface with the external system 104. Alternatively, the client system 103 comprises a single server for performing these functions.

In the following examples, secure data and protected resources, are referred to as being accessible by a user, and that the data is associated with the user. For example, the user may have access to an online user account, such as an online banking account, via an account interface provided by the external system 104. In this scenario, the user may be assigned a unique username and a shared secret (e.g. login information), such as a password, that can be used to access the user account via the account interface. Once the user has accessed the user account, that user is able to access the data via the user account. Therefore, the data is accessible by the user via login information that is unique to the user.

The secure data and protected resources that are accessible by the first user may be accessible by the external system 104 itself. The secure data and protected resources may be accessible by the user only, unless otherwise authorised by the user. In other words, the data/protected resource are prevented from being sent to a device or a system that is remote and distinct from the external system 104, such as the client system 103, without the corresponding user providing authorisation to the external system 104 for the data to be sent to a remote device or system.

Each one of the external system 104, the client system 103 and the user device 101 are arranged to communicate with one another via a communications network 110. The communications network 110, in this example, is the Internet 110. However, it will be appreciated that any suitable form of communications network 110 could be used.

Each one of the external system 104, the client system 103, and the user device 101 are web-enabled and may comprise a display, a user interface, a processor and memory. The devices and systems 101, 103, 104 can be arranged to communicate data between one another via any suitable communications protocol or connection. For instance, the devices and systems 101, 103, 104 may communicate with one another via a wired and/or a wireless connection.

The user device 101 may be any suitable type of personal computing device, such as a laptop computer, a desktop computer, a web-enabled telephone, such as a smartphone, or a tablet device. The client system 103 and the external system 104 may be any suitable type of computing system or collection of computing systems, such as a server or a collection of servers.

Figure 3:
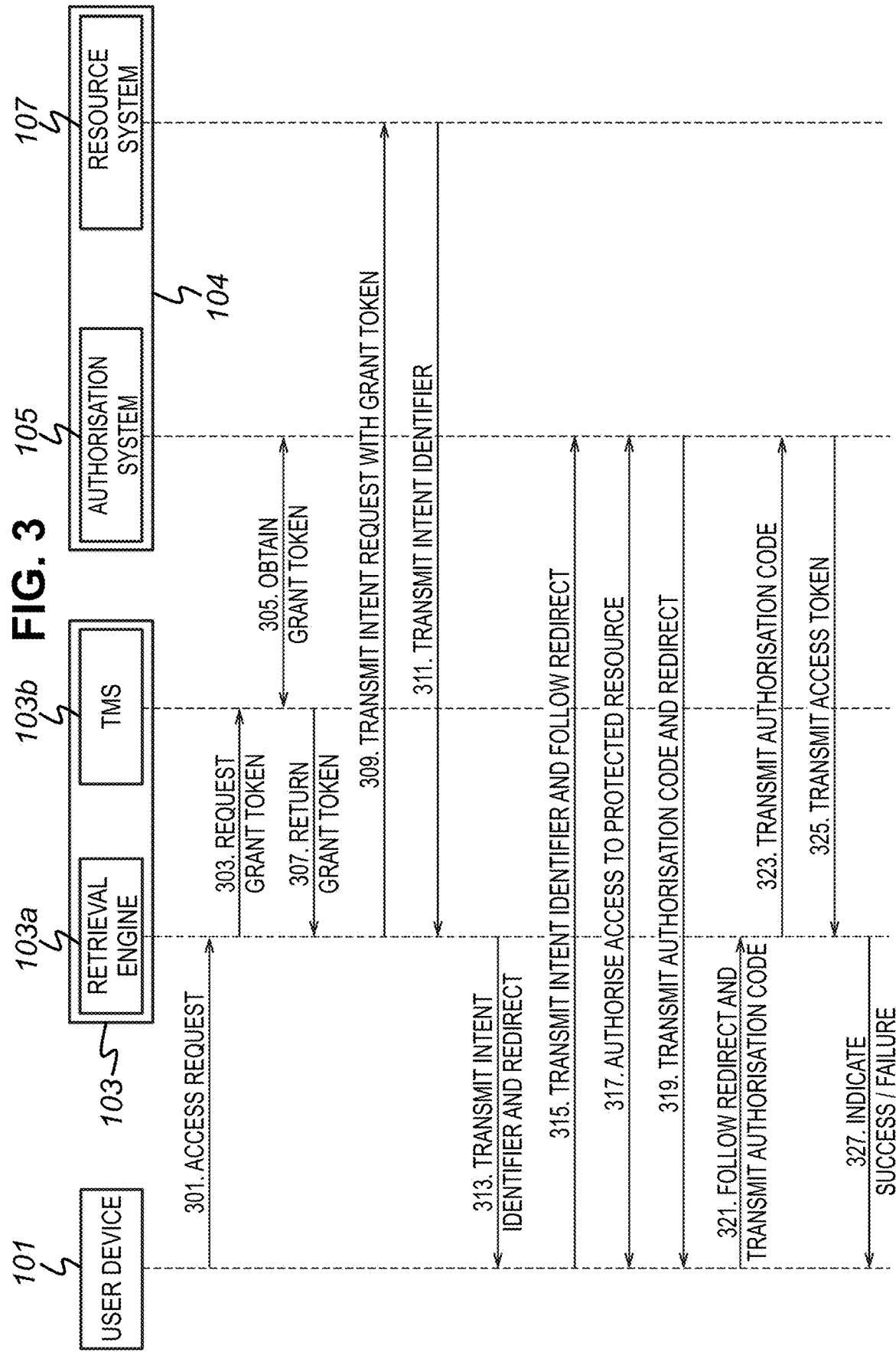
FIGS. 3 and 4 illustrate a protocol sequence diagram of a computer-implemented invention for accessing a protected resource.
Figure 4:
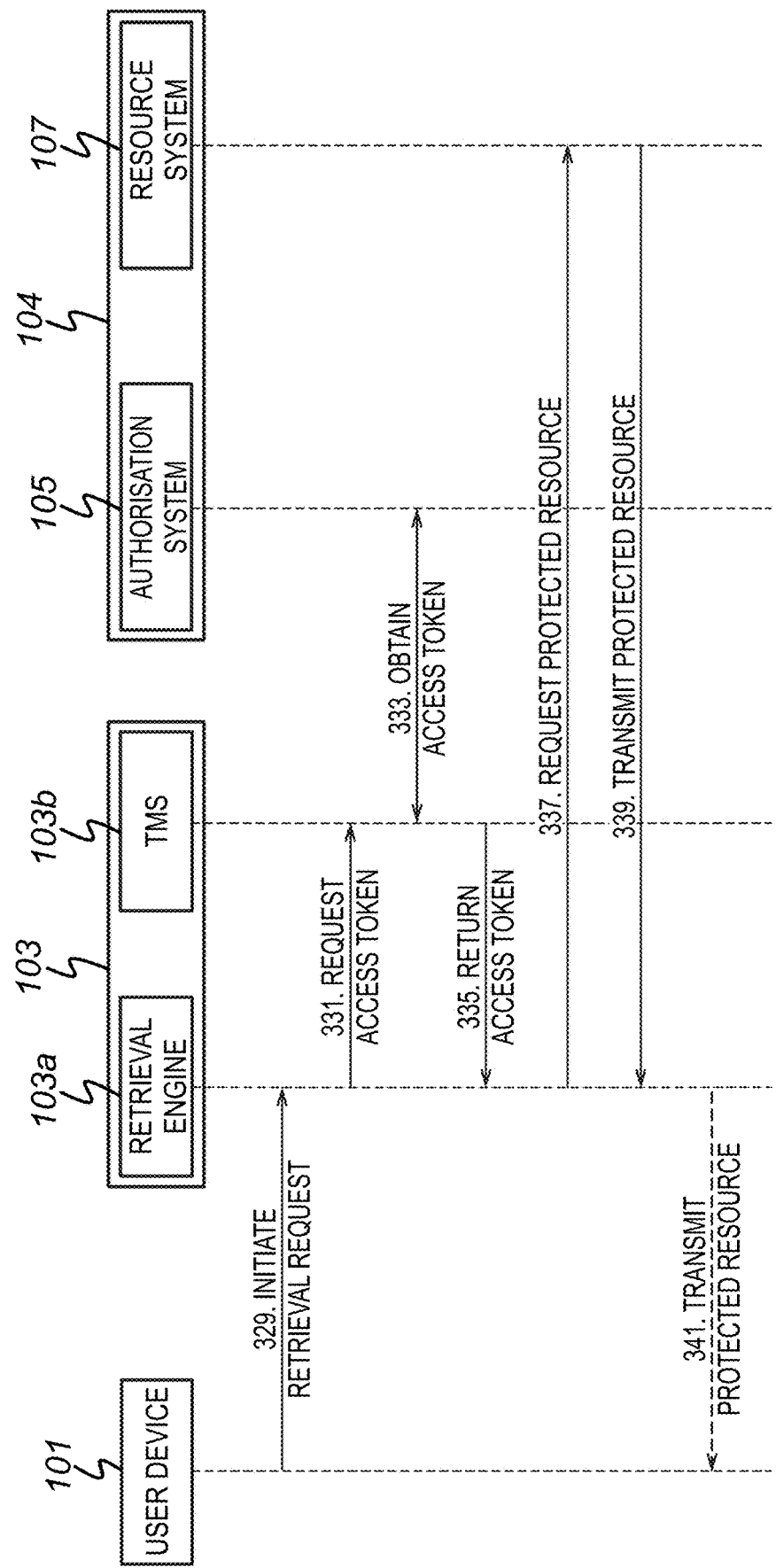

Referring to FIGS. 3 and 4, there is a computer-implemented method in which the client system 103 obtains access to a protected resource associated with the user of the user device 101 from the external system 104.

In step 301, the user device 101 transmits an access request to the retrieval engine 103a at the client system 103. The access request comprises an instruction for the client system 104 to initiate accessing the protected resource stored at the external system 104, in other words the access request indicates the user's intent for the client system 103 to access the protected resource.

In response to the access request received from the user device 101, the client system 103 performs steps 303 to 307 for obtaining a grant token from the external system 104. The grant token can be used by the client system 103 to identify itself to the external system 104 in order to initiate requests for the protected resource.

In step 303, the retrieval engine 103a transmits a request for a grant token to the TMS 103b.

In step 305, the TMS 103b forwards the request for the grant token to the authorisation system 105 at the external system 104. The authorisation sever 105 validates the request for the grant token. If the request for the grant token is valid, the authorisation system 105 responds by transmitting the grant token to the TMS 103b.

In step 307, if the grant token has been received, the TMS 103b forwards the grant token to the retrieval engine 103a.

Once the client system 103 has received the grant token, steps 309 and 311 can be performed in order to receive an intent identifier from the external system 104. The intent identifier is an identification label that can be used to identify a specific request from the user for the client system 103 to access a protected resource associated with the user from the external system 104 (i.e. the user's intent for the client system 103 to access the protected resource). The client system 103 is able to receive the intent identifier, if it has been issued with a valid grant token previously.

In step 309, the retrieval engine 103a transmits an intent request to the resource system 107 at the external system 104. The intent request is sent with the grant token received previously, which identifies the client system 103 to the external system 104.

In step 311, in response to the intent request, the external system 104 validates the grant token. If the intent request is valid, the resource system 107 responds by transmitting an intent identifier to the TMS 103a.

In step 313, the retrieval engine 103a forwards the intent identifier to the user device 101. In addition, an instruction to redirect to the authorisation system 105 is sent to the user device 101 along with the intent identifier. The redirect instruction may comprise a URL corresponding with the authorisation system 105.

In step 315, the user device 101 is redirected to the authorisation system 105 using the URL, and the user device 101 transmits the intent identifier to the authorisation system 105. The intent identifier is used by the authorisation system 105 to identify the user's intention for the client system 103 to access the protected resource.

In step 317, the user device 101 and the authorisation system 105 communication with one another in order for the user to provide authorisation for the client system 103 to access the protected resource. This step may involve the user selecting the protected resource, or a portion of the protected resource such as a specific sub-set of data relating a specific user account (or group of accounts) stored at the resource system 107 that are accessible by the user.

In step 319, once the user has provided authorisation for the client system 104 to access the protected resource, the authorisation system 105 transmits an authorisation code to the user device 101. The authorisation code comprises an indicator that the user has provided authorisation. In this step, the authorisation system 105 transmits an instruction to the user device 101 to redirect to the client system 103. This redirect instruction may comprise a URL corresponding with the retrieval engine at the client system 103.

In step 321, the user device 101 is redirected to the retrieval engine 103a, and the user device 101 transmits the authorisation code to the retrieval engine 103a.

In step 323, the retrieval engine 103a transmits a request for an access token by transmitting the authorisation code to the authorisation system 105. The authorisation code may be transmitted directly from the retrieval engine 103a to the authorisation system 105, or indirectly via the TMS 103b.

In step 325, the authorisation system 105 validates the authorisation code. If the authorisation code is valid, the authorisation system 105 responds by transmitting an access token the retrieval engine 103a. The access token can be used by the retrieval engine 103a to access the protected resource stored at the resource system.

In step 327, if the access token has been received successfully, the retrieval engine 103a transmits a success message indicating that the access token has been received. Alternatively, if the access token has not been received, the retrieval engine 103a transmits a failure message indicating that the access token has not been received.

Referring to FIG. 4, in step 329 the user device 101 transmits a request to the retrieval engine 103a for the client system 103 to retrieve the protected resource. If the access token has been received previously by the client system 103, the method proceeds to step 337. Alternatively, if the access token has not been received previously, steps 331 to 335 are performed in order for the client system 103 to obtain the access token in a similar manner to that described above.

In step 331, the retrieval engine 103a forwards a request for an access token to the TMS 103b. Then, in step 333, the TMS 103b forwards the access token request to the authorisation system 105 and, in response, receives the access token. In step 335, the access token is transmitted from the TMS 103b to the retrieval engine 103a.

In step 337, the retrieval engine 103*a* transmits a request for the protected resource by transmitting the access token to the resource system 107. In step 339, the resource system 104 the access token. If the access token is valid, the resource system responds by transmitting the protected resource to the retrieval engine 103*a*.

In step 341, once the protected resource has been received by the client system 103, the retrieval engine transmits the protected resource to the user device 101. Once received, the protected resource can be displayed at the user device 101 via an app or a browser at the user device 101.

Figure 5:
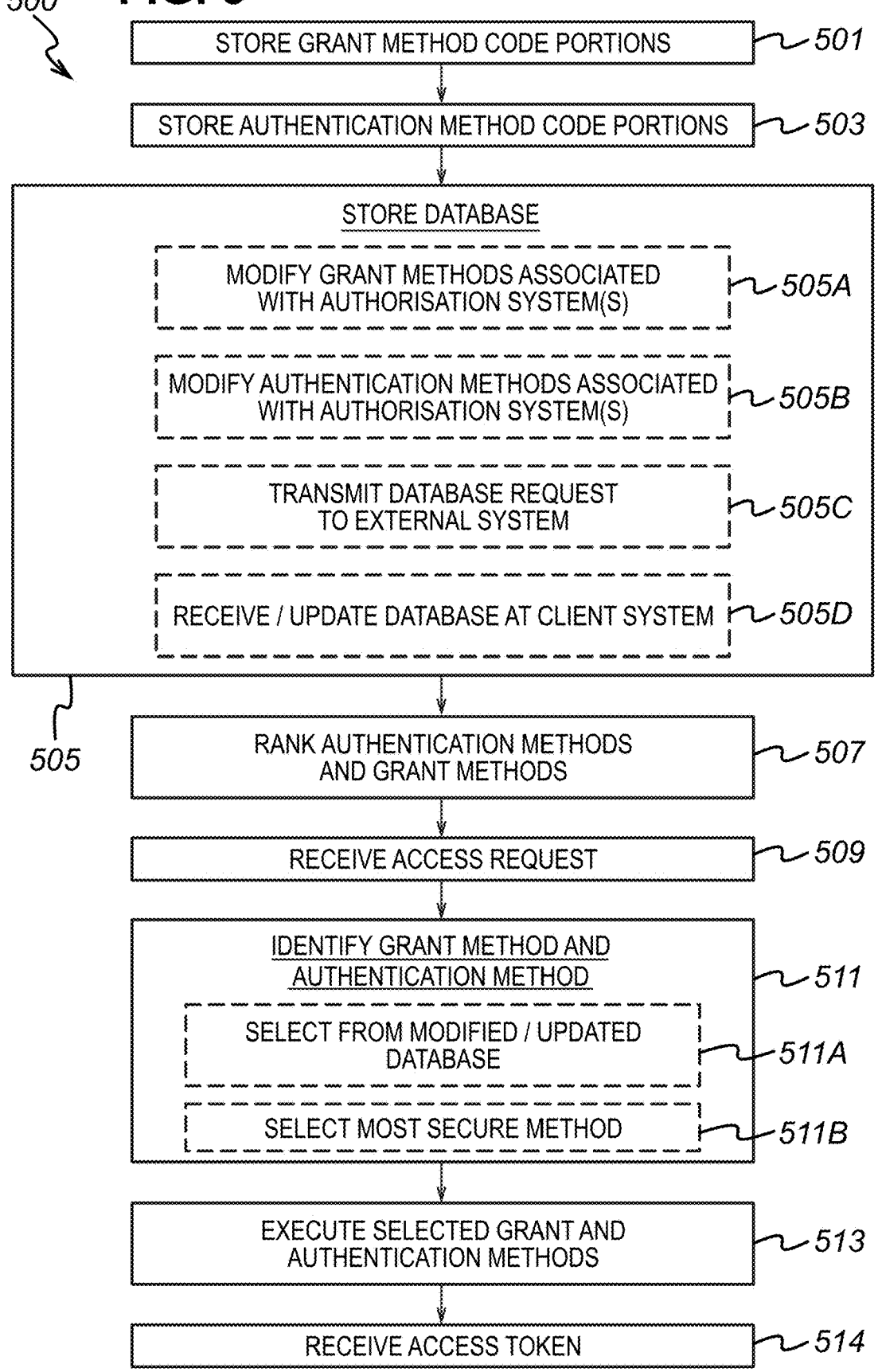
FIG. 5 illustrates a flow chart of a computer-implemented method in which a client system is configured to execute a selected authentication method and grant method for obtaining an access token used for accessing a protected resource.

Referring to FIG. 5, there is a computer-implemented method 500 performed by the client system 103 that enables the client system 103 to flexibly adapt to the grant and authentication methods supported by the external system 104. This method can be used in conjunction with the method described above with reference to FIGS. 3 and 4.

In step 501, the client system 103 stores a plurality of grant method code portions. Each of the grant method code portions are stored in memory at the client system 103 and are executable by a processor of the client system 103. Execution of any one of the grant method code portions causes the client system 103 to obtain an access token from the authorisation system 105 of the external system 104 using a specific type of grant method. The grant method corresponding to a particular grant method code portion is different to the grant methods corresponding to other the grant method code portions.

As discussed previously, the authorisation system 105 may support one or more of a plurality of different types of grant method, each of which enable the client system 103 to access a protected resource. In the OAuth 2.0 framework there are a number of available types of grant method, (or "grant types" as referred to in the OAuth 2.0 framework). The grant methods may comprise types such at the "authorisation code", "implicit", "resource owner password credentials" and "client credentials" grant types.

An overview of the "authorisation code" grant type is described above with reference to steps 313 to 327 of FIG. 3. In these steps the authorisation system 105 provides an authorisation code in response to the user authorising access the protected resource. The client system 103 is then able to exchange the authorisation token for the access token at the authorisation system 105.

The "client credentials" grant type involves fewer steps than the "authorisation code" grant type. Instead of redirecting the user device 101 to the authorisation system 105 in order to obtain the authorisation code, the client system 101 transmits a request for the access token comprises a client identifier and a client secret, which is some form of shared secret such as a password. The request for the access token comprises an indication of the grant type being used which, in this case is the "client credentials" grant type. The authorisation system 105 validates the client identifier and the client secret. If the client identifier and the client secret are valid, the authorisation system 105 responds with the access token.

Although only certain grant types have been described herein, any other suitable grant type(s) could be used in addition to or instead of the grant type(s) described.

In step 503, the client system 103 stores a plurality of authentication method code portions. Each of the authentication method code portions are stored in memory at the client system 103 and are executable by a processor of the client system 103. Execution of any one of the authentication method code portions causes the client system 103 to authenticate itself to the external system 104 during the process of obtaining the access token. The authentication method corresponding to a particular authentication method code portion is different to the authentication methods corresponding to the other authentication method code portions.

As discussed previously, an authorisation system may support one or more of a plurality of different types of authentication method, each of which enabling the client system 103 to authenticate itself to the external system 104. In the OAuth 2.0 framework there are a number of available types of authentication methods, (or "authentication types"). The authentication methods may comprise types such as the "client secret" authentication method and the "client assertion" authentication method.

The "client secret" authentication method defines the way in which the client system 103 authenticates itself at the authorisation system 105 when obtaining the access token. If the "client secret" authentication method is used, the client system 103 will transmit a client secret to the authorisation system 103 when requesting the access token. The client secret is a shared secret, such as a password, assigned to the client system 103. The authorisation system 105 uses the client secret to authenticate the client system 103 in validating requests for the access token.

The "client assertion" authentication method is similar to the "client secret" method. However, in the "client assertion" authentication method the client system 103 transmits an integrity protected version of the client secret. For instance, the client secret may be integrity protected using a digital signature or Message Authentication Code (MAC). In this way, the client secret can be protected from eavesdropping and tampering.

Although only certain authentication types have been described herein, any other suitable authentication type(s) could be used in addition to or instead of the authentication type(s) described.

In step 505, the client system 103 stores a configurable database that identifies which authorisation systems support which grant and authentication method types. The configurable database comprises a plurality of authorisation system identifiers that are each indicative of a particular authorisation system. Thus, each authorisation system identifier enables a specific authorisation system to be identified, such as the authorisation system 105 described with reference to FIG. 2.

Each one of the authorisation system identifiers is stored in association with one or more of the plurality of types of grant method. In other words, each authorisation system identifier is logically linked with one or more of the types of grant method in the database. This enables the database to indicate which grant method type(s) are supported by a specific authorisation system.

In addition, each one of the authorisation system identifiers is stored in association with one or more of the plurality of types of authentication method. In other words, each authorisation system identifier is logically linked with one or more of the types of authentication method in the database. This enables the database to indicate which authentication method type(s) are supported by a specific authorisation system.

The database is configurable such that it can be updated in order to modify the types of grant method and the authentication method that are associated with each authorisation system identifier. Since the client system 103 is capable of executing a plurality of different types of the authentication and grant methods by virtue of the grant and authentication method code portions, the client system 103 can adapt to changes in the types of method supported by an external system in a quick and simple fashion.

In addition, the configurable database can be updated in order to store additional authorisation system identifiers and associated grant and authentication method types. This allows the client system 103 to be configured for communicating with an external system with which the client system 103 has not previously communicated.

In steps 505A-B, the grant and authentication methods associated with one or more of the authorisation systems can be modified. This may occur in response the client system 103 receiving a message that the grant and/or authentication methods supported by an authorisation system have changed. For instance, the client system 103 may receive a message from the external system 104, or any other system, that a particular grant or authentication method is no longer supported by its authorisation system 105. The client system 103 may disassociate the unsupported grant or authentication method with the authorisation system identifier in response to this message.

In another example, the client system may receive a message from the external system 104, or any other system, that a particular grant or authentication method that was not previously supported by the authorisation system 105 is now supported. The client system 103 may associate the newly supported grant or authentication method with the authorisation system identifier in response to this message.

Instead of receiving a message from another system regarding the supported grant/authentication types and responding accordingly, the database may be configured by an administrator at the client system 103 to reflect which methods are supported by a selected authorisation system.

The client system 103 may perform steps 505C-D in order to maintain an accurate copy of the configurable database. This allows the client system 103 to ensure that the correct grant/authentication methods are used when communicating with the external system 104.

In step 505C, the client system 103 transmits a database request to a system that hosts the database which indicates the grant/authentication systems that are supported by a selection of authorisation systems. The database hosting system responds to the database request by transmitting at least a portion of the database to the client system 103. Then, in step 505D, the client system 103 updates the configurable database using the database received from the database hosting system. In this step, the configurable database is configured to store the one or more of the grant/authentication methods in the received database in association with the corresponding authorisation system identifier.

The client system 103 may execute step 505C in an interment fashion. This allows the client system 103 to conserve bandwidth usage by reducing amount of communication between the client system 103 and the system that stores the database. The client system 103 may transmit the database request in accordance with a predetermined schedule. For instance, the predetermined schedule may define a time interval between consecutive database requests. In one example, the time interval between each data request is defined as 24 hours in the predetermined schedule, such that a single database request is sent once a day. This achieves a balance between the aim of maintaining an accurate version of the database at the client system 103 and bandwidth usage. The predetermined schedule may be configurable. For instance, the time interval between adjacent database requests may be configurable by an administrator of the client system 103. This allows the client system 103 to be tuned in order for the optimum number of database requests to be sent within a given time period.

As discussed above, the authorisation system 105 may support different types of grant method and authentication method. However, one of these different types of method may be more or less secure than the other types. For example, the "authorisation code" grant method may be more secure than the "client credentials" grant method. In another example, the "client secret" authentication method may be less secure than the "client assertion" authentication method.

In step 507, the client system 103 ranks the types of grant method and authentication method in the configurable database based on the security strength of each grant type. This step may involve associating a score with each one of the grant method types and each one of the authentication method types, which indicates the security strength of each method. For example, the "authorisation code" grant method may be associated with a score of "10" and the "client credentials" grant method may be associated with a score of "5". In this way, the respective scores indicate that the "authorisation code" grant method is more secure that the "client credentials" grant method.

In another example, the "client secret" authentication method may be associated with a score of "4" and the "client assertion" authentication method may be associated with a score of "9". In this way, the respective scores indicate that the "client assertion" authentication method is more secure than the "client secret" authentication method.

Ranking the grant and authentication methods based on their security strength allows the client system 103 to choose the more secure method, where a choice is available. This enhances the security of the system as a whole, since using less secure methods may expose the system to issues such as eavesdropping.

In step 509, the client system 103 receives an access request from the user device 101 in a similar manner to that described in step 301 of FIG. 3. The access request comprises an instruction for the client system 103 to access a protected resource. The access request also comprises a request identifier which indicates the authorisation system with which the client system 103 must communicate with before accessing the protected resource at the corresponding resource system. In this example, the authorisation system is the authorisation system 105 of the external system 104.

In step 511, the client system 103 compares the authorisation system 105 indicated by the access request against the authorisation systems indicated by the authorisation system identifiers in the configurable database. If a match is found, the grant and authorisation method types associated with the matching authorisation system are identified.

The identified authorisation and grant method types are the methods that are supported by the authorisation system 105 with which the client system 103 must communicate in order to service the access request. There may be a plurality grant method types supported by the authorisation system 105, or there may be only a single grant method type supported by the authorisation system 105. There may be a plurality of authentication method types supported by the authorisation system 105, or there may be only a single authentication method type supported by the authorisation system 105.

Steps 511A-B refer to the scenario in which a plurality of grant and/or authentication types are supported by the authorisation system 104. In step 511A, the client system 103 selects one of the grant method types and one of the authentication method types identified in step 511. The method type selected may be based on a variety of different criteria, for instance by choosing the fastest or the most efficient method of each type available.

Step 511B refers to a specific example in which the most secure grant and/authentication method is chosen. In this step, the client system 103 selects the most secure method based on the ranking process performed in step 507. For instance, the grant method or the authentication method with the highest score is selected for execution.

In step 513, the grant method code portion corresponding with the selected grant method is executed, and the authentication method code portion corresponding with the selected authentication method is executed.

In step 514, if the client system 103 is successfully validated at the authorisation system 104 using the selected grant and authentication methods, the client system 103 receives the access token. Subsequently, the client system 103 can transmit the access token to the resource system 107 in order to obtain the protected resource corresponding with the access request in step 501.

Figure 6:
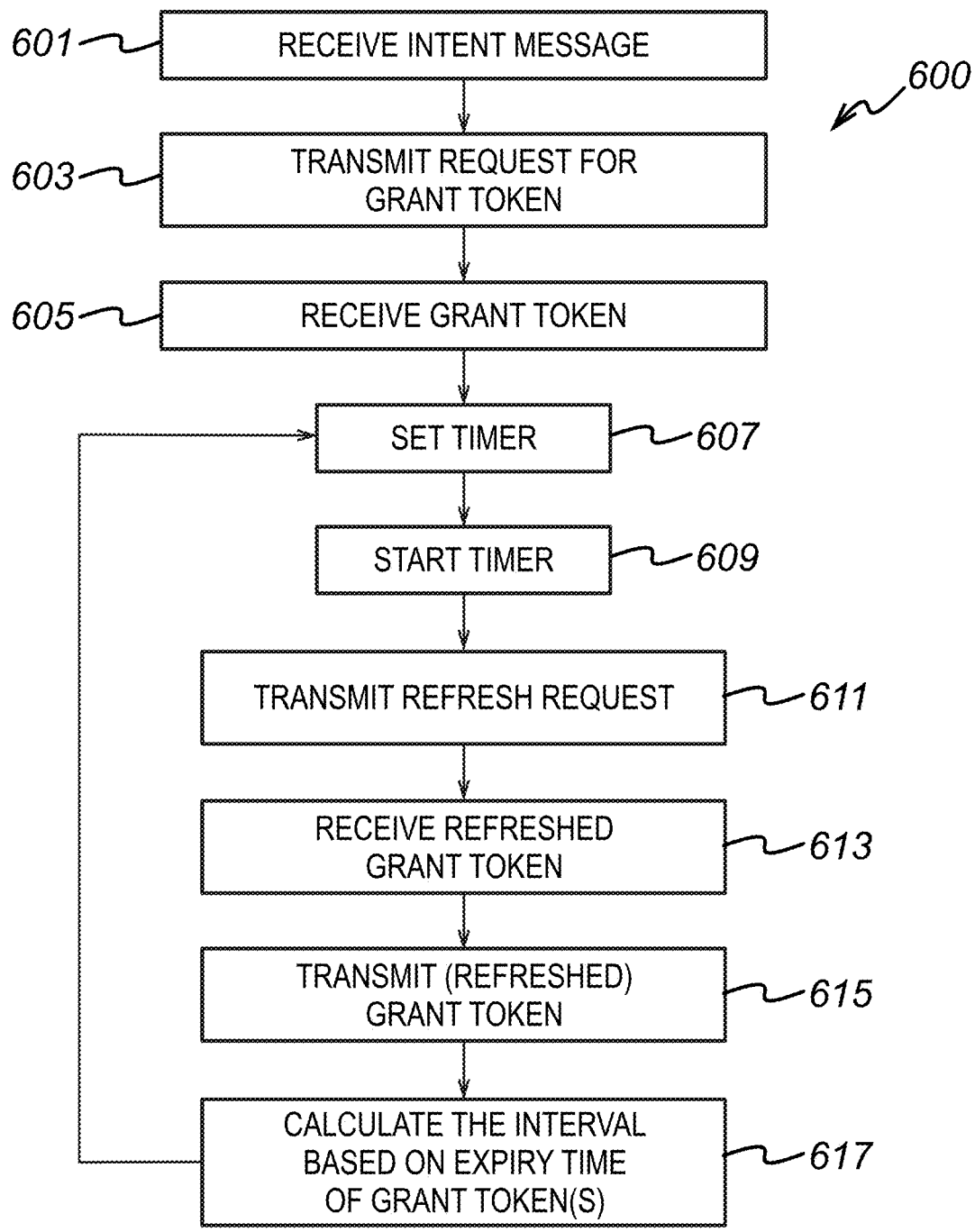
FIG. 6 illustrates a flow chart of a computer-implemented method in which a client system refreshes a grant token based on its expiry time.

Referring to FIG. 6, there is a computer-implemented method 600 that enables the client system 103 to ensure that it has access to a valid grant token, which is required in order to successfully respond to requests from the user to access a protected resource. This method can be used in conjunction with the method described above with reference to FIGS. 3 and 4.

Each of the grant tokens provided to the client system 103 by the authorisation system 105 may have a corresponding time to expire which is the time at which the identification will not be considered valid at the authorisation system. Thus, an expired grant token cannot be used in the process of obtaining a protected resource from the resource system 107. If the grant token stored at the client system 103 is not valid (i.e. the token has expired) at a time when an access request (such as the request described with reference to step 301 in FIG. 3) is received, the client system 103 may not be able to service the access request successfully, or at the least there will be a delay in servicing the request. Thus, the method described with reference to FIG. 6 allows user access requests to be serviced reliably and quickly, by ensuring that a valid grant token is held by the client system 103.

In step 601, the client system 103 receives an intent message from the user device 101. The intent message may be the access message described previously. Thus, step 601 may be performed in a similar manner to step 301 described with reference to FIG. 3. The access message may be referred to an as intent message because this message indicates the user's intent for the client system 103 to access the protected resource.

In step 603, the client system 103 transmits a request for a grant token to the authorisation system 105. As explained above with reference to FIG. 3, the grant token is a token that enables the external system 104 to authenticate the identity of the client system 103.

In step 605, the authorisation system 105 validates the client system's 103 request for an identification code. If the request is valid, the authorisation system 105 responds by transmitting the grant token to the client system 103. The authorisation system 105 may transmit an expiry time indicator to the client system 103 that indicates the expiry time of the grant token. In addition, the authorisation system 105 may transmit a refresh token to the client system 103 that can be used to obtain a new (i.e. an unexpired) grant token.

Steps 603-505 may be performed in a similar manner to that described with reference to steps 303-307 in FIGS. 3 and 4. Also, steps 603-605 may be performed before, after or at the same time as receiving the intent message of step 601.

In step 607, a time interval is determined which defines the time between receiving the grant token and requesting a new one, and a timer is set using the time interval. The time interval may be a predetermined time interval, such as a 1 minute, 5 minutes or 10 minutes etc. This time interval may be based on the expiry time of the received grant token. For instance, the time interval may be equal to the expiry time of the grant token, such that the client system 103 can initiate the process of requesting a new grant token at the moment the grant token expires. In a specific example, the expiry time of the grant token may be 5 minutes and the time interval may, therefore, be set to 5 minutes. Thus, the client system 103 will request a new grant token 5 minutes after the previous grant token has been received, which is the moment at which the previous token expires.

In another example, the time interval may be set as an amount of time less than the expiry time of the grant token. In this way, the client system 103 can initiate the process of requesting a new grant token before the grant token expires. In a specific example, the expiry time of the grant token may be 5 minutes and the time interval may be set to 4 minutes. Thus, the client system 103 can ensure that there is only a small window of time between requesting a new grant token and expiry of the previous token. The time interval may be set such that this window us not greater than a predefined window length (e.g. 1 minute). This window can be configured by configuring the time interval to optimise the number of refresh requests sent, while ensuring that a valid grant token is held at the client system 103.

In another example, the time interval may be set as an amount of time greater than the expiry time of the grant token. In this way, the client system 103 can ensure that the process of requesting a new grant token will occur at a precise moment after the previous grant token has expired. In a specific example, the expiry time of the grant token may be 5 minutes and the time interval may, therefore, by set to 6 minutes. Thus, the client system 103 can ensure that there is only a small window of time between expiry of the grant token and the request for a new one. The time interval may be set such that this window is not greater than a predefined window length (e.g. 1 minute). Again, this window can be configured by configuring the time interval to optimise the number of refresh requests sent, while ensuring that a valid grant token is held at the client system 103.

In step 609, the client system 103 starts a timer in response to receiving the grant token and using the time interval set in step 607. The timer is used to determine the moment at which the time interval has elapsed.

In step 611, once the time interval has elapsed the client system 103 transmits a refresh request to the authorisation system 105. The refresh request may comprise an instruction for a new (i.e. unexpired) grant token to be provided to the client system 103 from the authorisation system 105.

In step 613, the client system 103 receives the new grant token in response to the refresh request.

In step 615, the client 103 may transmit the most recently received grant token to the resource system 107 in order to initiate a request for the protected resource. Step 615 may be performed in a similar manner that described with reference to step 309 of FIG. 3.

Steps 601 to 615 may be repeated such that many different grant tokens are received from the authorisation system 107. In addition, steps 601 to 615 may be repeated for other authorisation system such that many different grant tokens are received from a variety of authorisation systems. The grant tokens received from a particular authorisation system may have similar expiry times.

In step 617, the time interval discussed in connection with steps 607 and 609 is calculated based on the expiry times of the grant tokens received and the specific authorisation systems from which the grant tokens are received.

In one example, the client system 103 may calculate a predicted expiry time of the grant tokens received from a particular authorisation system. The predicted expiry time may be calculated by calculating an average of the expiry times of the grant token received from a specific authorisation system, or a plurality of different authorisation systems.

The predicted expiry time calculated in step 617 may be used to determine the time interval in step 607. For instance, the predicted expiry time may equal to, a time less than or a pre-set time greater than the time interval in step 607.

Figure 7:
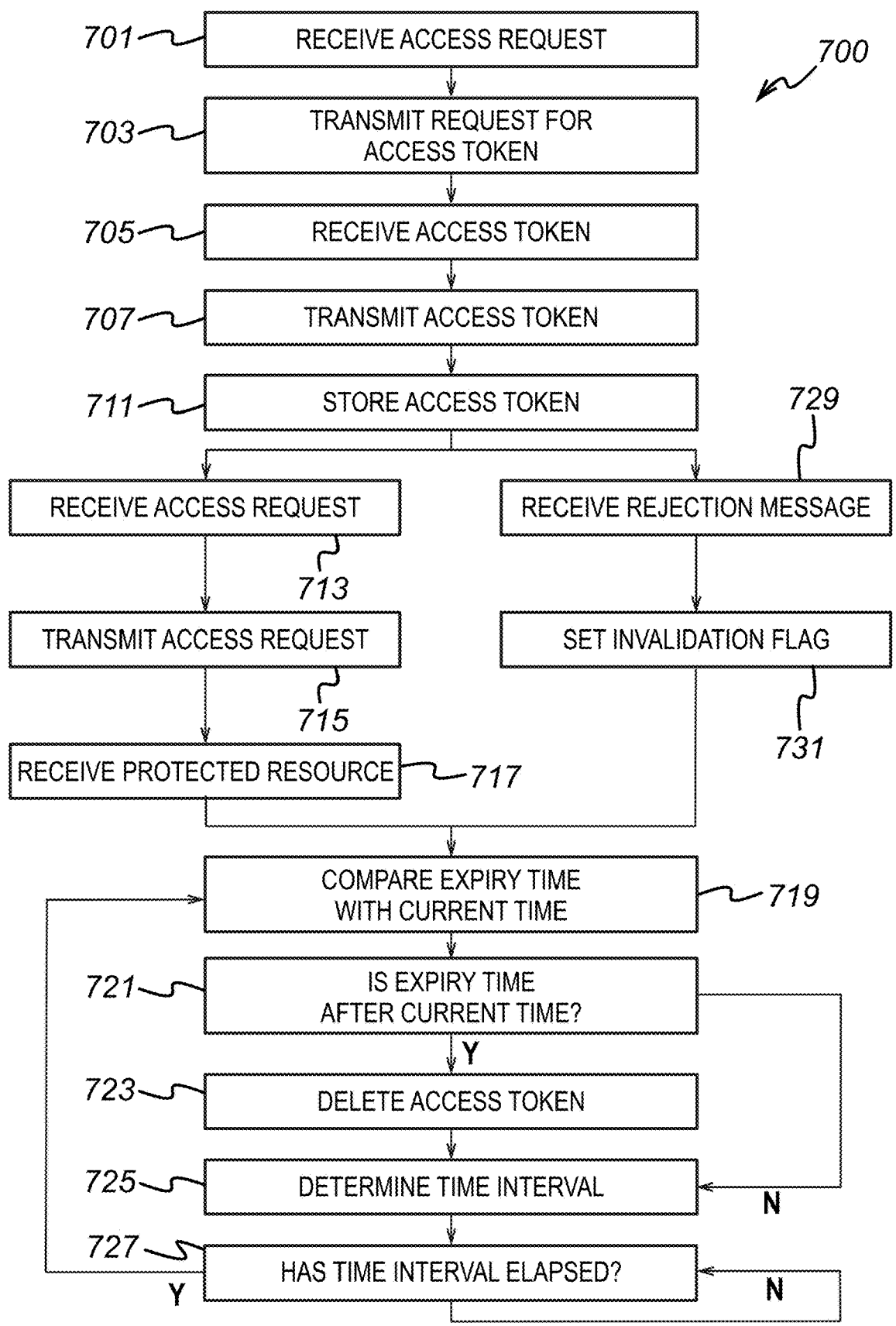
FIG. 7 illustrates a flow chart of computer-implemented method for managing and storing valid and invalid access tokens.

Referring to FIG. 7, there is a computer-implemented method 700 that enables the client system 103 reduce the bandwidth and processing resources used by minimising the number of requests for access tokens sent, such as the requests for access tokens described with reference to steps 323 and 325 in FIG. 3. Thus, the method described with reference to FIG. 7 can be used in conjunction with the method described above with reference to FIGS. 3 and 4.

In step 701, the client system 103 receives an access request from the user device 101. This step may be performed in a similar manner to that described with reference to step 301 in FIG. 3.

In step 703, the client system 103 transmits a request for an access token to the authorisation server 105 in response to the access request. This step may be performed in a similar manner to step 323, for instance after steps 303 to 321 have been performed, as described with reference to FIG. 3.

In step 705, the client system 103 receives the access token from the authorisation system 105. This step may be performed in a similar manner to step 325, as described with reference to FIG. 3. In this step, the authorisation system 105 may transmit an expiry time indicator to the client system 103. The expiry time indicator corresponds to the access token and indicates the expiry time of the access token. After the expiry time indicated by the expiry time the access token cannot be used to access the protected resource. In other words, the expiry time indicator is indicative of the time at which the corresponding access token will not be valid for obtaining the protected resource from the resource system 107. In step 505, the authorisation system 105 can transmit a refresh token corresponding with the access token. The refresh token can be used by the client system 3 obtain an unexpired access token from the authorisation system 105.

The expiry time indicator may be indicative of a length of time during which the access token will be valid. For instance, this length of time may be expressed as a number of second or minutes. Alternatively, the expiry time may indicate a point in time at which the access token will no longer be valid. For instance, the expiry time may indicate a specific time during the day. The client system 103 may determine the expiry time of the access token based on the length of time or the point in time indicators by the expiry time indicator.

In step 707, the client system 103 transmits the access token to the resource system 107 in a request to receive the protected resource. This step may be performed in a similar manner to step 337 as described with reference to FIG. 4.

In step 711, the access token received from the authorisation system 107 is stored at a token storage unit at the client system 103. The expiry time indicated by the expiry time indicator may be stored at the token storage unit also. The access token and/or the expiry time indicated by the expiry time indicator may be encrypted and stored at the token storage unit to enhance security. In this step, the access token may be stored independently of the expiry time of the corresponding access token. In other words, the client system 103 stores the access token irrespective of whether the expiry time is short or long. This reduces the processing effort required in analysing the expiry time of each access token. Alternatively, the client system 103 may not store, or may delete, the access token if its expiry time is less than a predetermined threshold. If the access token is stored, the access token may be stored after its expiry time.

In step 713, the client system 103 receives another access request similar to the access request received in step 701.

In step 715, the client system 103 transmits the stored access token to the authorisation system 107 in another request to receive the protected resource similar to the request sent in step 707. Thus, the client system 103 uses the stored access token, rather than requesting a new access token to service the user's access request. This reduces the bandwidth and processing resources used by the client system 103.

In steps 719 to 727, token storage maintenance requests performed at the client system 103. These steps assist in conserving storage resources, while making more efficient use of bandwidth and processing resource by minimising the number of requests for new access tokens.

In step 719, the client system 103 compares the time indicated by the expiry time indicator corresponding with one or more of the access tokens stored.

In step 721, if the time indicated by an expiry time indicator is after the current time, the method proceeds to step 723. Alternatively, if the time indicated by the expiry time indicator is not after the current, the method proceed to step 725.

In step 723, the access token corresponding with the expiry time that is after the current time is deleted.

Steps 719 to 723 may be performed intermittently. For instance, steps 719 may be executed in accordance with a predetermined schedule. In one example, the predetermined schedule defines a time interval between adjacent executions of steps 719 to 723. This time interval may be configurable at the client system 103 based on a user input received from an administrator. The time interval may be configurable at the client system 103 based on monitored performance of the client system 103. Configuration of the time interval may occur automatically.

Steps 725 and 727 may be executed In order to perform steps 719 to 723 in accordance with the predetermine schedule. In step 725, the time interval of the predetermined schedule is determined. Then, in step 727 the method proceed to repeat steps 719 to 723 once the time interval has elapsed.

Steps 729 and 731 may be performed in the method 700 in order to manage a situation in which an access token has become invalid and, therefore, will not be usable for obtaining the protected resource. When an access token has become invalid it should not be used again, as this will involve unnecessary communications being transmitted in between the client system 103 and the external system 104. However, deleting access tokens each time they are deemed to be invalid involves a processing burden that it would preferable to avoid. This is particularly relevant when the client system 103 handles a large number of access token for a large number of users with protected resources stored at a variety of external systems. Steps 729 and 731 allow the transmission of invalid access to be prevented, while avoiding the processing burden managing the storing of access tokens an on individual basis.

In step 729, the client system 103 receives a rejection message indicating that the access token is not valid. This message may be received from the external system 104, for instance via the authorisation system 105 or the resource system 107. Alternatively, the rejection message may be received from any other system, or may be received via an input at the client system 103.

The rejection message may be received in response to the external system 104 determining that the access token has expired. For example, the client system 103 may transmit the stored access token to the authorisation system 105 in an attempt to access the protected resource. However, the authorisation system 107 may determine that the access token has expired. In response to determining the access token has expired, the authorisation system 107 transmits a rejection message to the client system 103.

In another example, the rejection message may be received in response to the user of the user device 101 revoking their authorisation for the client system 103 to access the protected resource. The user may inform the authorisation system 107 that their authorisation has been revoked. This will invalidate the corresponding access token, and its corresponding refresh token. However, in this scenario the client system 103 will be unaware that access token and the refresh token have been invalidated. Therefore, the client system 103 may continue to transmit requests for access to the protected resource using the invalid access token. The client system 103 will receive a rejection message from the external system 104 in response to each one of these requests because the access token is invalid. However, the client system 103 might still transmit refresh requests using the invalid refresh token, under the assumption that the access token has expired rather than the user's authorisation having been revoked. All of these processes represent an unnecessary load on the processing resources and bandwidth of the client system 103. If the access token has a corresponding refresh token, the rejection message comprises an indication that the refresh token is invalid.

In step 731, rather than deleting the access token and the refresh token directly in response to the rejection message, the client system 103 sets an invalidation flag in association with the corresponding access token and refresh token. Setting the invalidation flag involves a lower processing overhead than deleting the tokens. Thus, when the client system 103 is managing many tokens, this will equate to a significant enhancement in efficiency.

The invalidation flag may be an addition bit field stored in association with the access token and the refresh token. For instance, if the bit field is set to "1", this may indicate that the corresponding token is invalid, and, if the bit field is set to "0", this may indicate that the corresponding token is invalid (or vice versa).

Figure 8:
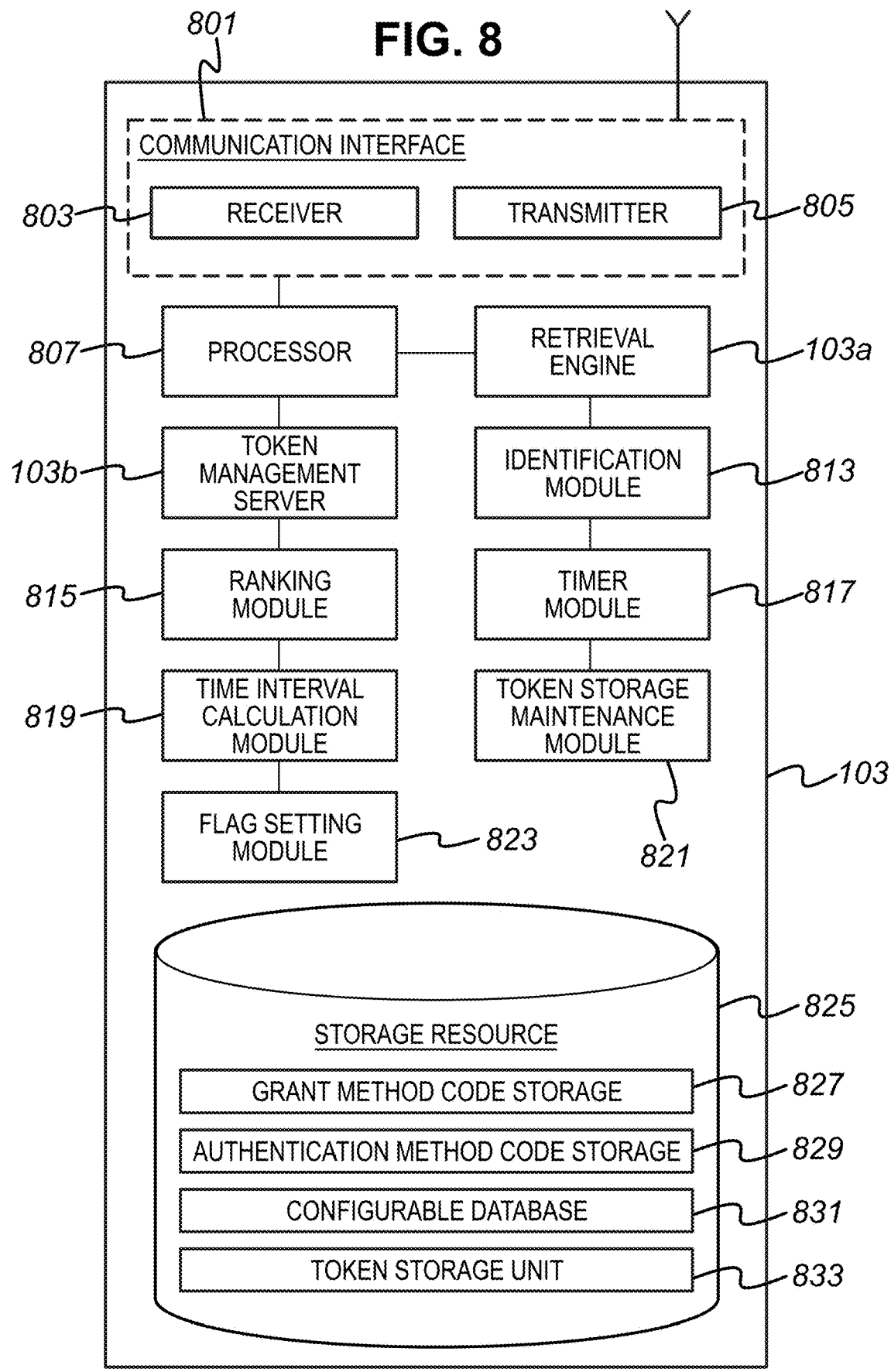
FIG. 8 illustrates a schematic diagram of a client system.

In another example, the invalidation flag may be set by modifying the expiry time indicator associated with the access token and/or the refresh token. In this example, the expiry time indicator is set in the past in order to indicate that the token(s) are no longer valid. Thus, when steps 719 to 727 are performed subsequently, the tokens will be deleted as part of the token storage maintenance steps Referring to FIG. 8, the client system 103 comprises a communication interface 801 comprising a receiver 803 and a transmitter 805. The client system 103 comprises a processor 807, an identification module 813, a ranking module 815, a timer module 817, a time interval calculation module 819, a token storage maintenance module and a flag setting module 823. The client system 103 also comprises the retrieval engine 103a and the token management server 103b described above.

There is a storage resource 825 at the client system 103 which comprises a grant method code portion storage resource 827, an authentication method code storage resource 829, a configurable database storage resource 831 and a token storage unit 833.

The receiver 803 and the transmitter 805 are configured to receive and transmit message, instructions and tokens to and from the client system 103 as explained above.

The storage resource 825 is configured to store grant method code portions, as described above with reference to step 501, at the grant method code portions storage resource 827. The storage resource 825 is configured to store authentication method code portions, as described above with reference to step 503, at the authentication method code portion storage resource 829. The storage resource 825 is configured to store the configurable database, as described above with reference to step 505, at the configurable database storage resource 831. The token storage unit 833 is arranged for storing tokens, such as the access tokens, grant tokens and refresh tokens described above.

The ranking module 817 is configured to perform the ranking processes described above, such as those described above with reference to step 507. The identification module 813 is configured to identify the authentication method and grant methods supported by an authorisation server, as described above with reference to step 511. The processor 807 is configured to execute instructions, such as the instruction of the selected grant and authentication method code portions, as described with reference to step 513. The timer module 817 is configured to activate a timer for a time period, for instance as described above with reference to step 607, 609. In addition, the timer module 817 can be used to monitor a current time for comparison with the expiry time of a token, as described above with reference to step 719. The time interval calculation module 819 is configured to calculate a time interval for setting the timer, as described above with reference to step 725. The token storage management module 821 is configured to compare the current time indicated by the timer with the expiry time of a token, and to delete a token in response, as described above with reference to steps 721 and 723 above. The flag setting module 823 is configured to set an invalidation flag in association with a token, as described above with reference to step 731.

FIG. 9 shows an exemplary electronic device 901 according to any of the electronic devices or systems of this disclosure (such as the user device 101, client system 103, the external system 104, the authorisation system 105, the resource system 107, the retrieval engine 103a or the TMS 103b). The electronic device 901 comprises processing circuitry 910 (such as a microprocessor) and a memory 912. Electronic device 901 may also comprise one or more of the following subsystems: a power supply 914, a display 916, a transceiver 920, and an input 926.

Processing circuitry 910 may control the operation of the electronic device 901 and the connected subsystems to which the processing circuitry is communicatively coupled. Memory 912 may comprise one or more of random access memory (RAM), read only memory (ROM), non-volatile random access memory (NVRAM), flash memory, other volatile memory, and other non-volatile memory.

Display 916 may be communicatively coupled with the processing circuitry 910, which may be configured to cause the display 916 to output images representative of the secure data, or protected resources, shared between the entities in the system 100.

The display 916 may comprise a touch sensitive interface, such as a touch screen display. The display 916 may be used to interact with software that runs on the processor 910 of the electronic device 901. The touch sensitive interface permits a user to provide input to the processing circuitry 910 via a discreet touch, touches, or one or more gestures for controlling the operation of the processing circuitry and the functions described herein. It will be appreciated that other forms of input interface may additionally or alternatively be employed for the same purpose, such as the input 926 which may comprise a keyboard or a mouse at the input device.

The transceiver 920 may be one or more long-range RF transceivers that are configured to operate according to communication standard such as LTE, UMTS, 3G, EDGE, GPRS, GSM, and Wi-Fi. For example, electronic device 901 may comprise a first wireless transceiver 921, such as a cellular transceiver, that is configured to communicate with a cell tower 903 via to a cellular data protocol such as LTE, UMTS, 3G, EDGE, GPRS, or GSM, and a second transceiver 928, such as a Wi-Fi transceiver, that is configured to communicate with a wireless access point 904 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance) between the short-range end nodes (e.g. electronic device and wireless beacon).

Electronic device 901 may be configured to communicate via the transceiver 920 with a network 940. Network 940 may be a wide area network, such as the Internet, or a local area network. Electronic device 901 may be further configured to communicate via the transceiver 920 and network 940 with one or more systems or user devices. These servers or user devices may be any one of those described herein.

The term "comprising" encompasses "including" as well as "consisting" e.g. a composition "comprising" X may consist exclusively of X or may include something additional e.g. X+Y.

The word "substantially" does not exclude "completely" e.g. a composition which is "substantially free" from Y may be completely free from Y. Where necessary, the word "substantially" may be omitted from the definition of the invention.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

List of Numbered Embodiments

1. A computer-implemented method comprising:
receiving, at a client system from an authorisation system, a first grant token for identifying the client system at the authorisation system, the first grant token having a corresponding time to expire indicative of a time at which the first grant token will not be valid for obtaining a protected resource from a resource system;
transmitting, from the client system to the authorisation system, a refresh request for a second grant token for identifying the client system at the authorisation system, wherein the refresh request is transmitted based on the expiry time of the first grant token; and
receiving the second grant token at the client system, in response to the refresh request.

2. The computer-implemented method of embodiment 1 further comprising:
transmitting the first grant token or the second grant token for authorising, at the authorisation server, the client system to access the protected resource; and
subsequently receiving, at the client server, the protected resource from the resource system.

3. The computer-implemented method of embodiment 1 further comprising:
receiving, at the client system from a user device, an intent message indicating that a user of the user device intends for the client system to access a protected resource at a resource system;
in response to the intent message, transmitting the first or the second grant token to the resource system and, in response, receiving at the client system an intent identification label for identifying the protected resource;
transmitting the intent identification label to the user device for authorising, at the authorisation server, the client system to access the protected resource.

4. The computer-implemented method of embodiment 3 further comprising:
receiving an authorisation code at the client system, in response to transmitting the intent identification label to the user device; and
transmitting the authorisation code to the authorisation system and, in response, receiving an access token for accessing the protected source at the resource system.

5. The computer-implemented method of embodiment 4 further comprising:
transmitting the access token to the resource system from the client system and, in response, receiving the protected resource at the client system.

6. The computer-implemented method according to any one of the preceding embodiments wherein the refresh request is transmitted from the client system before the expiry time of the first grant token.

7. The computer-implemented method according to any one of the preceding embodiments wherein the refresh request is transmitted from the client system at a time interval after receiving the first identification time.

8. The computer-implemented method of embodiment 7 wherein the time interval is configurable at the client system.

9. The computer-implemented method of embodiment 7 or embodiment 8 further comprising calculating the time interval based on the time to expire of each of a plurality of tokens received from the authorisation system.

10. The computer-implemented method of embodiment 9 further comprising calculating the time interval based on an average time to expire of a plurality of tokens received from the authorisation system.

11. The computer-implemented method according to any one of the preceding embodiments further comprising:
receiving, at the client system from the authorisation system, a refresh token associated with the first grant token;
wherein transmitting the refresh request comprises transmitting the refresh token to the authorisation system.

12. The computer-implemented method according to any one of the preceding embodiments wherein the client system comprises one or more client servers in communication with one another.

13. The computer-implemented method according to any one of the preceding embodiments wherein the authorisation system comprises one or more authorisation servers in communication with one another.

14. The computer-implemented method according to any one of the preceding embodiments wherein the resource system comprises one or more resource servers in communication with one another.

15. A computer program comprising instructions which, when the program is executed by a computer, cause the computer to carry out the method of any one of the preceding embodiments.

16. A data carrier signal carrying the computer program of embodiment 15.

17. A computer readable medium comprising instructions which, when executed by a computer, cause the computer to carry out the method of any one of embodiments 1 to 14.

18. A client system comprising processing circuitry configured to:
receive, from an authorisation system, a first grant token for identifying the client system at the authorisation system, the first grant token having a corresponding time to expire indicative of a time at which the first grant token will not be valid for obtaining a protected resource from a resource system;
transmit, to the authorisation system, a refresh request for a second grant token for identifying the client system at the authorisation system, wherein the refresh request is transmitted based on the expiry time of the first grant token; and
receive the second grant token at the client system, in response to the refresh request.

19. A client system comprising:
a receiver configured to receive, from an authorisation system, a first grant token for identifying the client system at the authorisation system, the first grant token having a corresponding time to expire indicative of a time at which the first grant token will not be valid for obtaining a protected resource from a resource system; and
a transmitter arranged to transmit, to the authorisation system, a refresh request for a second grant token for identifying the client system at the authorisation system, wherein the refresh request is transmitted based on the expiry time of the first grant token;
wherein the receiver is configured to receive the second grant token at the client system, in response to the refresh request.

What is claimed is:
1. A computer-implemented method comprising:
receiving, at a client system from an authorisation system, a first grant token, wherein the first grant token identifies the client system at the authorisation system and has a corresponding time to expire indicative of a time after which the first grant token cannot be used to obtain a protected resource from a resource system;
transmitting, from the client system to the authorisation system, a refresh request for a second grant token, wherein the second grant token identifies the client system at the authorisation system, wherein the refresh request is transmitted from the client system to the authorisation system based on the expiry time of the first grant token that is calculated using a defined time interval after receiving the first grant token, wherein the defined time interval is calculated based on an average of a plurality of expiry times associated with a plurality of grant tokens received from the authorisation system; and receiving the second grant token at the client system, in response to the refresh request.

2. The computer-implemented method of claim 1 further comprising:

transmitting the first grant token or the second grant token that authorises, at the authorisation system, the client system to access the protected resource; and subsequently receiving, at the client system, the protected resource from the resource system.

3. The computer-implemented method of claim 1 further comprising:

receiving, at the client system from a user device, an intent message indicating that a user of the user device intends for the client system to access a protected resource at a resource system;

in response to the intent message, transmitting the first or the second grant token to the resource system and, in response, receiving at the client system an intent identification label for identifying the protected resource; and transmitting the intent identification label to the user device for authorising, at the authorisation server, the client system to access the protected resource.

4. The computer-implemented method of claim 3 further comprising:

receiving an authorisation code at the client system, in response to transmitting the intent identification label to the user device; and transmitting the authorisation code to the authorisation system and, in response, receiving an access token for accessing the protected source at the resource system.

5. The computer-implemented method of claim 4 further comprising:

transmitting the access token to the resource system from the client system and, in response, receiving the protected resource at the client system.

6. The computer-implemented method of claim 1 wherein the refresh request is transmitted from the client system before the expiry time of the first grant token.

7. The computer-implemented method of claim 1 wherein the time interval is configurable at the client system.

8. The computer-implemented method of claim 1 further comprising:

receiving, at the client system from the authorisation system, a refresh token associated with the first grant token;

wherein transmitting the refresh request comprises transmitting the refresh token to the authorisation system.

9. The computer-implemented method of claim 1 wherein the client system comprises one or more client servers in communication with one another.

10. The computer-implemented method of claim 1 wherein the authorisation system comprises one or more authorisation servers in communication with one another.

11. The computer-implemented method of claim 1 wherein the resource system comprises one or more resource servers in communication with one another.

12. An article of manufacture comprising:

a non-transitory computer processor readable medium; and instructions stored on the medium;

wherein the instructions are configured to be readable from the medium by at least one computer processor and thereby cause the at least one computer processor to operate so as to:

receive, at a client system from an authorisation system, a first grant token, wherein the first grant token identifies the client system at the authorisation system and has a corresponding time to expire indicative of a time after which the first grant token cannot be used to obtain a protected resource from a resource system;

transmit, from the client system to the authorisation system, a refresh request for a second grant token, wherein the second grant token identifies the client system at the authorisation system, wherein the refresh request is transmitted from the client system to the authorisation system based on the expiry time of the first grant token that is calculated using a defined time interval after receiving the first grant token, wherein the defined time interval is calculated based on an average of a plurality of expiry times associated with a plurality of grant tokens received from the authorisation system; and receive the second grant token at the client system, in response to the refresh request.

13. A non-transitory computer readable medium comprising instructions which, when executed by a computer, cause the computer to carry out the method of:

receiving, at a client system from an authorisation system, a first grant token, wherein the first grant token identifies the client system at the authorisation system and has a corresponding time to expire indicative of a time after which the first grant token cannot be used to obtain a protected resource from a resource system;

transmitting, from the client system to the authorisation system, a refresh request for a second grant token, wherein the second grant token identifies the client system at the authorisation system, wherein the refresh request is transmitted from the client system to the authorisation system based on the expiry time of the first grant token that is calculated using a defined time interval after receiving the first grant token, wherein the defined time interval is calculated based on an average of a plurality of expiry times associated with a plurality of grant tokens received from the authorisation system; and receiving the second grant token at the client system, in response to the refresh request.

14. A client system comprising processing circuitry configured to:

receive, from an authorisation system, a first grant token, wherein the first grant token identifies the client system at the authorisation system and has a corresponding time to expire indicative of a time after which the first grant token cannot be used to obtain a protected resource from a resource system;

transmit, to the authorisation system, a refresh request for a second grant token, wherein the second grant token identifies the client system at the authorisation system, wherein the refresh request is transmitted from the client system to the authorisation system based on the expiry time of the first grant token that is calculated using a defined time interval after receiving the first grant token, wherein the defined time interval is calculated based on an average of a plurality of expiry times associated with a plurality of grant tokens received from the authorisation system; and receive the second grant token at the client system, in response to the refresh request.

15. A client system comprising:

a receiver configured to receive, from an authorisation system, a first grant token, wherein the first grant token identifies the client system at the authorisation system and has a corresponding time to expire indicative of a time after which the first grant token cannot be used to obtain a protected resource from a resource system; and a transmitter arranged to transmit, to the authorisation system, a refresh request for a second grant token, wherein the second grant token identifies the client system at the authorisation system, wherein the refresh request is transmitted from the client system to the authorisation system based on the expiry time of the first grant token that is calculated using a defined time interval after receiving the first grant token, wherein the defined time interval is calculated based on an average of a plurality of expiry times associated with a plurality of grant tokens received from the authorisation system;

wherein the receiver is configured to receive the second grant token at the client system, in response to the refresh request.

* * * * *